US011485213B2

(12) United States Patent
Eich, IV

(10) Patent No.: US 11,485,213 B2
(45) Date of Patent: Nov. 1, 2022

(54) STRADDLE-RIDDEN VEHICLE FRAME STIFFENER

(71) Applicant: Ernest Paul Eich, IV, Charlotte, NC (US)

(72) Inventor: Ernest Paul Eich, IV, Charlotte, NC (US)

(73) Assignee: Ernest Paul Eich, IV, Charlotte, NC (US)

( * ) Notice: Subject to any disclaimer, the term of this patent is extended or adjusted under 35 U.S.C. 154(b) by 142 days.

(21) Appl. No.: 16/975,152

(22) PCT Filed: Feb. 22, 2019

(86) PCT No.: PCT/US2019/019064
§ 371 (c)(1),
(2) Date: Aug. 24, 2020

(87) PCT Pub. No.: WO2019/165155
PCT Pub. Date: Aug. 29, 2019

(65) Prior Publication Data
US 2020/0398927 A1    Dec. 24, 2020

Related U.S. Application Data

(60) Provisional application No. 62/634,851, filed on Feb. 24, 2018.

(51) Int. Cl.
*B62K 11/02* (2006.01)
*B62K 19/30* (2006.01)
(Continued)

(52) U.S. Cl.
CPC ............. *B60K 1/04* (2013.01); *B62K 11/02* (2013.01); *B62K 19/30* (2013.01);
(Continued)

(58) Field of Classification Search
CPC . B60K 1/04; B62J 43/20; B62K 11/02; B62K 19/30; B62K 2204/00
See application file for complete search history.

(56) References Cited

U.S. PATENT DOCUMENTS 3,966,007 A    6/1976   Havener et al.
8,556,018 B2 *  10/2013  Fujihara ................. B62J 43/16
                                                          180/220
(Continued)

FOREIGN PATENT DOCUMENTS

DE    102011078265 B3    6/2012
JP       2010264967 A    11/2010

OTHER PUBLICATIONS

Supplementary European Search Report issued for the corresponding european application No. EP 19 75 7918, dated Feb. 4, 2022, 9 pages (for informational purposes only).
(Continued)

*Primary Examiner* — Tony H Winner
*Assistant Examiner* — Michael R Stabley
(74) *Attorney, Agent, or Firm* — Viering, Jentschura & Partner mbB

(57) ABSTRACT

Herein is disclosed a straddle-ridden vehicle frame stiffener comprising a support structure for stiffening the straddle-ridden vehicle frame, the support structure comprising a first side; and a second side, adjacent to the first side; a first mounting element for removably mounting the support structure to the straddle-ridden vehicle frame, the first mounting element being attached to the first side; a second mounting element for removably mounting the support structure to the straddle-ridden vehicle frame, the second mounting element being attached to the second side; and wherein the first side and the second side are rigidly connected to one another.

17 Claims, 9 Drawing Sheets

(51) Int. Cl.
   *B60K 1/04*   (2019.01)
   *B62J 43/20*   (2020.01)
(52) U.S. Cl.
   CPC ............ *B60Y 2200/12* (2013.01); *B62J 43/20* (2020.02); *B62K 2204/00* (2013.01)

(56) References Cited

U.S. PATENT DOCUMENTS

| | | |
|---|---|---|
| 9,238,497 B2 * | 1/2016 | Matsuda ................ B60L 3/0061 |
| 9,579,983 B2 * | 2/2017 | Inoue ...................... B60L 50/66 |
| 2005/0006163 A1 | 1/2005 | Brendelson et al. |
| 2012/0097463 A1 | 4/2012 | Iwata et al. |
| 2012/0103716 A1 | 5/2012 | Fujihara et al. |
| 2012/0111651 A1 * | 5/2012 | Irie ........................ B62K 11/04 |
| | | 180/65.1 |
| 2014/0027193 A1 | 1/2014 | Annaberger et al. |
| 2014/0262568 A1 * | 9/2014 | Matsuda ................. B60L 58/26 |
| | | 180/65.1 |
| 2015/0232150 A1 | 8/2015 | Kosuge et al. |
| 2015/0314692 A1 | 11/2015 | Inoue |
| 2015/0344093 A1 | 12/2015 | Inoue |
| 2016/0231068 A1 * | 8/2016 | Schmitz ................ F28F 9/0265 |

OTHER PUBLICATIONS

International Search Report issued for corresponding PCT Application No. PCT/US2019/019064, dated May 1, 2019, 12 pages (for informational purpose only).

* cited by examiner

```
┌─────────────────────────────────────────────────────────────┐
│ Removing a stressed-member combustion engine from a first   │
│ frame segment of the straddle-ridden vehicle and a second   │
│ frame segment of the straddle ridden vehicle 1302           │
└─────────────────────────────────────────────────────────────┘
                              │
┌─────────────────────────────────────────────────────────────┐
│ Mounting a frame stiffener to the first frame segment and   │
│ the second frame segment 1304                               │
└─────────────────────────────────────────────────────────────┘
                              │
┌─────────────────────────────────────────────────────────────┐
│ the frame stiffener comprising: a support structure for     │
│ stiffening the straddle-ridden vehicle frame 1306           │
└─────────────────────────────────────────────────────────────┘
                              │
┌─────────────────────────────────────────────────────────────┐
│ the support structure comprising a first side; and a second │
│ side, adjacent to the first side 1308                       │
└─────────────────────────────────────────────────────────────┘
                              │
┌─────────────────────────────────────────────────────────────┐
│ a first mounting element for removably mounting the support │
│ structure to the straddle-ridden vehicle frame, the first   │
│ mounting element being attached to the first side 1310      │
└─────────────────────────────────────────────────────────────┘
                              │
┌─────────────────────────────────────────────────────────────┐
│ a second mounting element for removably mounting the        │
│ support structure to the straddle-ridden vehicle frame, the │
│ second mounting element being attached to the second side   │
│ 1312                                                        │
└─────────────────────────────────────────────────────────────┘
                              │
┌─────────────────────────────────────────────────────────────┐
│ wherein the first side and the second side are rigidly      │
│ connected to one another 1314                               │
└─────────────────────────────────────────────────────────────┘
```

FIG. 13

STRADDLE-RIDDEN VEHICLE FRAME STIFFENER

CROSS-CITING TO RELATED APPLICATION

This application claims priority to U.S. Provisional Application 62/634,851, and which was filed on Feb. 24, 2018, the entirety of which is hereby fully incorporated by reference.

TECHNICAL FIELD

Various embodiments relate generally to the replacement of a stress-bearing combustion engine with a stress-bearing frame member for storage of an alternative power source in straddle-ridden vehicles.

BACKGROUND

It is known to have a vehicle such as a motorcycle, ATV or other similarly straddle-ridden vehicle, in which a structural frame system connects front and rear wheels and contains a power source, a method of power transmission, and the systems required to operate the drive machinery such that motive power is transmitted to at least one of the wheels. A vehicle such as this type is generally powered by an internal combustion engine fueled by petroleum liquids but may have as a power source any number of other various systems or devices.

In such a straddle-ridden vehicle, the internal combustion engine is generally located between the legs and feet of the driver, with a geared or otherwise variable drive-ratio transmission mechanically located between the internal combustion engine (ICE) and the drive wheel(s). In a majority of such straddle-ridden vehicles, the structural frame of the vehicle surrounds the ICE and transmission assembly. In such arrangement, the structural integrity of the vehicle is independent of the actual power source such that the removal of the ICE and transmission result in a defined space within the structure of the vehicle frame system.

In certain straddle-ridden vehicles, however, the ICE and transmission assembly are designed as stress-bearing members of the vehicle frame system itself. In these particular vehicles, removal of the ICE and transmission results in an open and undefined space below the top frame member of the vehicle, between the driver's legs and feet, behind the forward wheel(s), and in front of the lower frame section of the vehicle. In such examples of straddle-ridden vehicles, removal of the ICE and transmission assembly results in a structurally incomplete vehicle frame.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which:

FIG. 13 shows a method of straddle-ridden vehicle frame stiffening.

DETAILED DESCRIPTION

Figure 1:
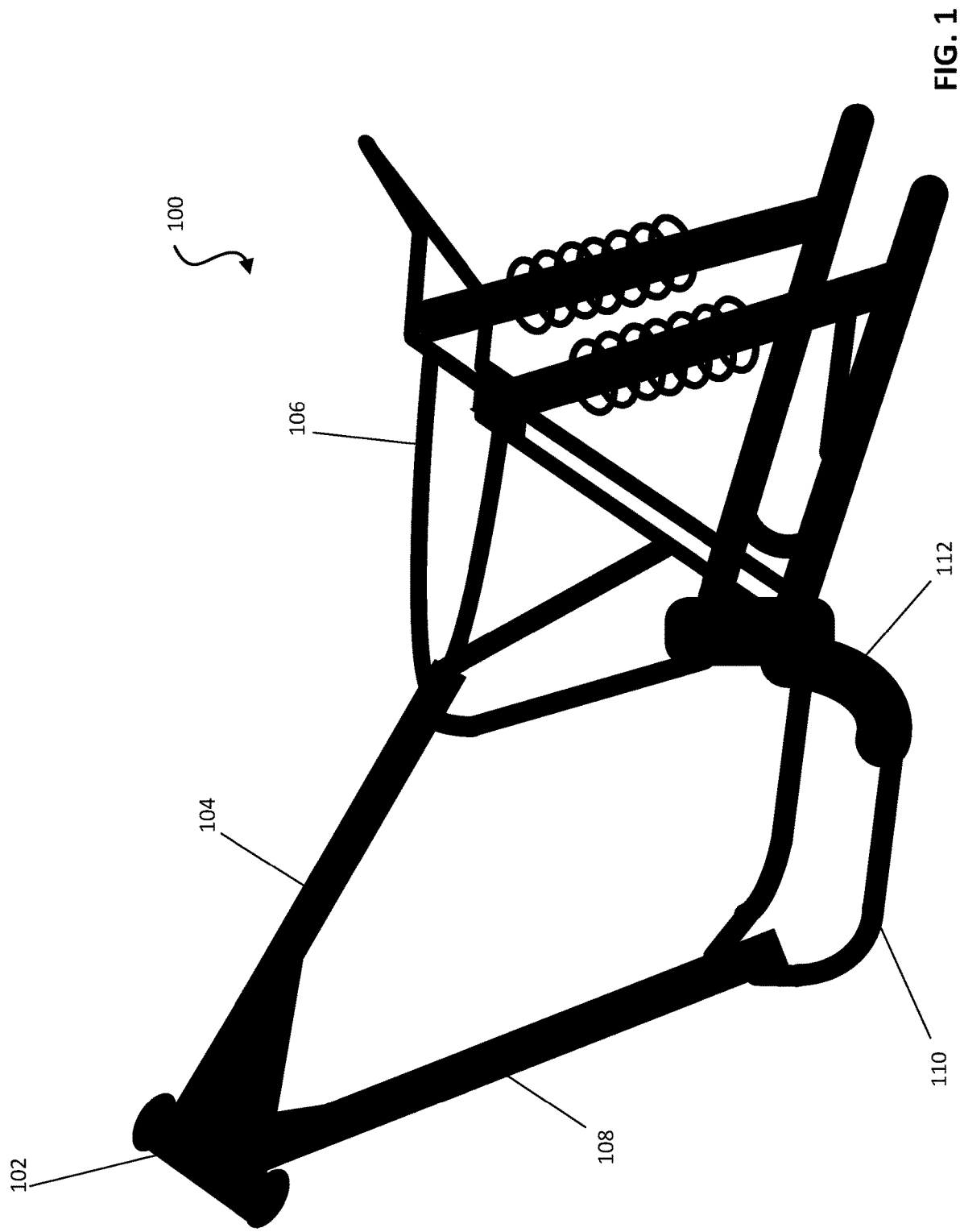
FIG. 1 depicts a straddle-ridden vehicle frame configured for a motor as a non-stress bearing member.

The following detailed description refers to the accompanying drawings that show, by way of illustration, specific details and embodiments in which the Disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The present Disclosure is a stress-bearing arrangement of engineered stress bearing members, including, but not limited to, plates, intended to replace a removed ICE and transmission assembly in such described design of straddle-ridden vehicles with stress-bearing ICE/Transmission assemblies. The arrangement of elements in the present Disclosure creates compartments for alternative power sources for the given straddle-ridden vehicle. The compartments of the present Disclosure provide location for electrical power sources and the necessary control and operation components to provide energy for electric drive motors on the modified straddle-ridden vehicle. Although the term ICE may be used throughout, a person skilled in the art will appreciate that the frame stiffener described herein can be installed in a void created by the ICE, one or more portions of a transmission assembly, or both. To the extent that the term ICE is used in isolation, it is intended to refer to at least one of the internal combustion engine, the transmission assembly, or a combination of both.

The term straddle-ridden vehicle is used herein to describe any vehicle operated in such a position that a portion of the vehicle's frame is located during operation between the driver's legs. Straddle-ridden vehicles as described herein may include, but are not limited to, motorcycles, mopeds, scooters, and motorized bicycles. The term straddle-ridden vehicle as used herein is intended to exclude non-motorized bicycles.

According to one aspect of the Disclosure, the drive motor(s) may be contained within the drive wheel itself and the modification device contains within its compartments an electric storage/supply device and electronic and mechanical controls for the vehicle systems. According to another aspect of the Disclosure, the drive motor(s) may be contained within the modification device and mechanically coupled to the drive wheel(s).

According to another aspect of the Disclosure, the frame stiffening device and its container may be designed to the dimensions for rechargeable chemical battery cells and the electronic control modules and systems required to send a drive-level electric current to an inwheel, electric drive motor that replaces the original vehicle's drive wheel. In one aspect of the Disclosure, the frame stiffening device attaches directly to the given straddle-ridden vehicle using the same mounting points as the removed ICE and transmission assembly.

In accordance with the present Disclosure, in a given straddle-ridden vehicle with ICE and transmission fashioned as stress-bearing members of the vehicle, the ICE/Transmission (ICE/T) assembly may be removed, separately from or along with mechanical and air-flow related systems for operation of the internal combustion engine. The currently disclosed subject matter fits into place on the given straddle-ridden vehicle, attaching with bolts to the same mount points as the original ICE/T assembly, and carries the stress forces that were previously borne by the assembly, thus creating compartments for the location of electric drive power supply components for the modified vehicle. The electric power supply may take the form of chemical batteries, fuel cell systems, rechargeable batteries or other methods/devices for energy storage and supply not currently envisioned at the time of this application.

In further accordance with the present Disclosure, additional brackets and structures may be required for proper housing of the components within the compartments of the present Disclosure. The specifics of the general design of the present Disclosure may also be modified for application to various other models of straddle-ridden vehicles. The inclusion, addition, modification or change to such details of design does not change the intent of the present Disclosure.

Various modifications are possible within the scope and intent of the present Disclosure. The present Disclosure may be fashioned from metals, alloys, composite materials or other substances and materials as have not been envisioned at the time of this application. The system of plates including the device may be joined by welding, bolting, riveting, casting, the application of epoxy or other methods of affixing not currently envisioned at the time of this application. Likewise, the present Disclosure need not be bolted to the existing frame of the given straddle-ridden vehicle as described but may also be welded, riveted, epoxyed or other method of attachment not currently envisioned at the time of this application.

The form of the given straddle-ridden vehicle is not limited to a motorcycle and may be a three- or four-wheel vehicle or the like. Various modifications may also be made as to the form and layout of the component parts such as the compartment orientation and locations, mounting methods, compartment inserts and adapters for various components installed therein, and the routing of wires, tubing, and other devices necessary to the operation of the vehicle.

The present Disclosure may also be modified to attach to the frame of a straddle-ridden vehicle in which the internal combustion engine is not an integral stress-bearing member. In such application of the present Disclosure one or more of the frame members of the existing straddle-ridden vehicle may be modified or removed entirely and a device following the principles of design described herein attached by some method to the modified frame of the provided vehicle thus bearing the stress of the original frame members to maintain the integrity of the vehicle structure.

The present Disclosure is not limited to the application for modification of an existing straddle-ridden vehicle; indeed the principles of design described herein may also be applied to a new vehicle design incorporating the stress-bearing structure of the described present Disclosure. Such an application of the concepts of design of the present Disclosure to a new straddle-ridden vehicle may be modular in design or integrated into the entire design and are intended for inclusion by this application for rights. Variations to the design described in this application are not to be regarded as a departure from the spirit and scope of the Disclosure, and all such modifications as would be obvious to one skilled in the art are intended to be included within the scope of this provisional application for patent rights.

FIG. 1 depicts a straddle-ridden vehicle frame 100 configured for a motor as a non-stress-bearing member. The frame is depicted in a substantially side view, with a left portion of the image corresponding to the front of the frame, and a top portion of the image corresponding to the top of the frame. The frame includes a head pipe 102, a main pipe 104, a sub tube 106, a front down tube 108, a sub tube holder 110, and a bottom plate 112. The presence or absence of the front down tube 108 may be largely determinative of whether the frame is configured to include a motor as a stress-bearing member. Generally, the front down tube 108 is a stress-bearing member, supporting and reinforcing the main pipe 104 and the sub tube holder 110. In configurations in which the front down tube 108 is present, the engine may be configured as a non-stress-bearing member and may be generally housed within the region defined by the main pipe 104, the front down tube 108, the sub tube holder 110 and the bottom plate 112.

Figure 2:
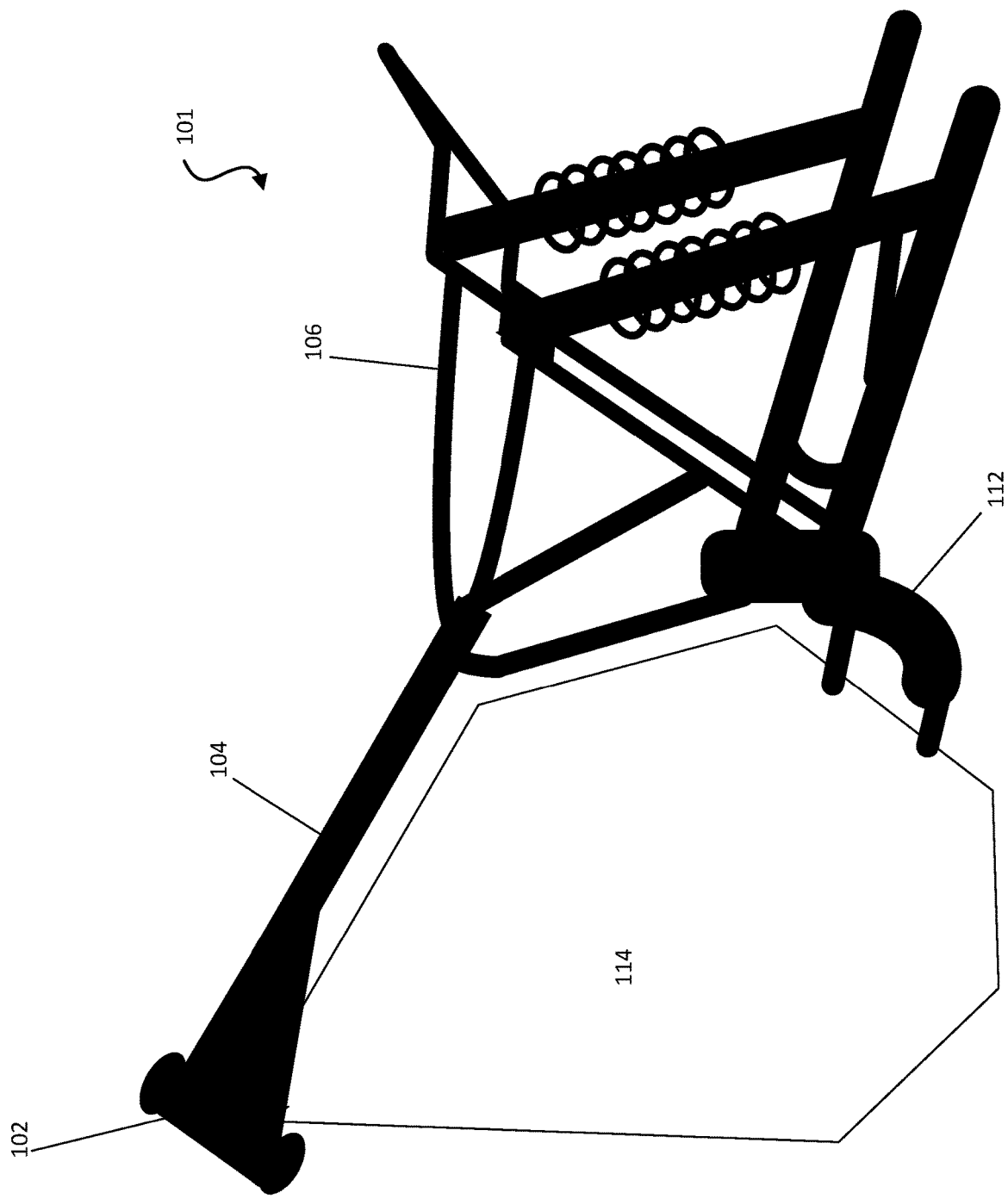
FIG. 2 depicts a straddle-ridden vehicle frame configured for a motor as a stress-bearing member.

FIG. 2 depicts a straddle-ridden vehicle frame 101 configured for a motor as a stress-bearing member. This frame may include a head pipe 102, a main pipe 104, a sub tube 106 and a bottom plate 112. The front down tube of FIG. 1 is not present in the frame configuration for a motor as a stress-bearing member. Rather, in this case, the region defined by 114 represents the motor and/or transmission, which itself is connected between the head pipe 102 or main pipe 104, and the bottom plate 112. In being so connected, the motor and/or transmission provides structural integrity and support for the main pipe 104 and the bottom plate 112.

Figure 3:
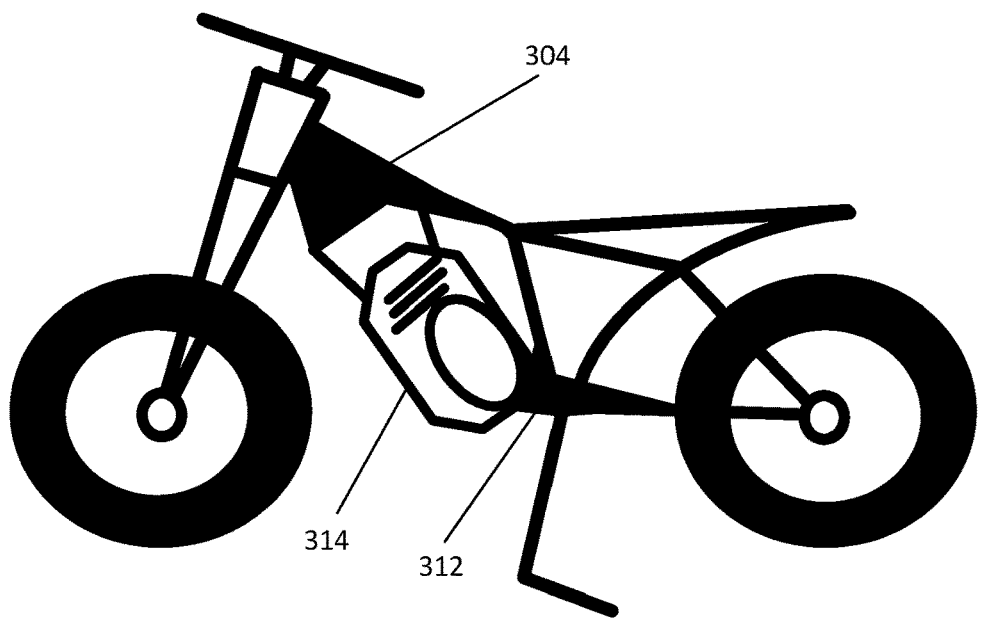
FIG. 3 depicts a side view of a straddle-ridden vehicle including a motor as a stress-bearing member.

FIG. 3 depicts a side view of a straddle-ridden vehicle including a motor as a stress-bearing member. A motor 314 is installed between the main pipe 304 and the bottom plate 312, such that the motor is a stress-bearing member that provides structural integrity and reinforcement between the main pipe 304 and the bottom plate 312.

Figure 4:
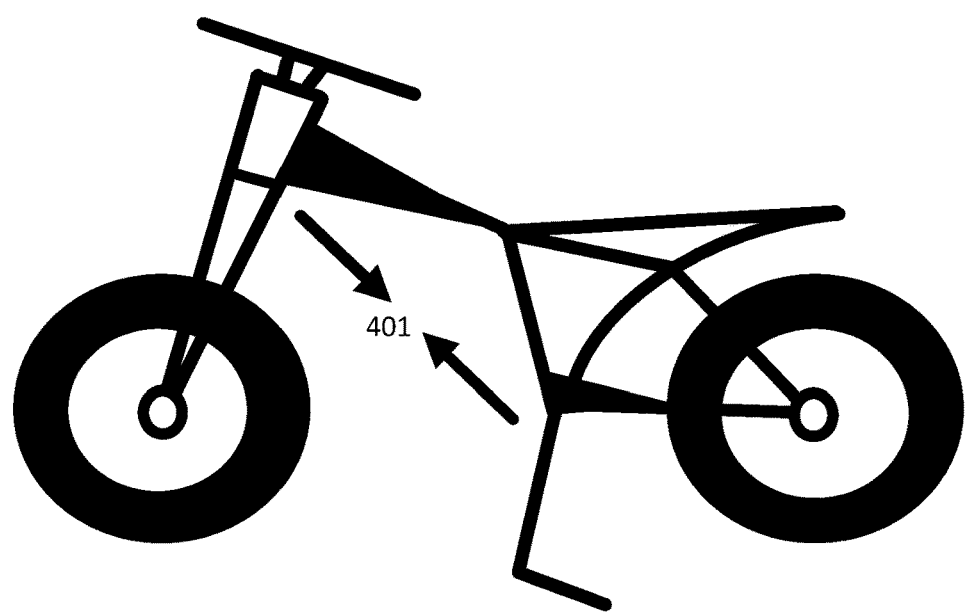
FIG. 4 depicts a side view of a straddle-ridden vehicle with a frame configured for a motor as a stress-bearing member, absent a motor.

FIG. 4 depicts a side view of a straddle-ridden vehicle with a frame configured for a motor as a stress-bearing member, absent a motor. This figure depicts the frame of FIG. 3, with the motor removed. The arrows depicted at 401 show approximate force vectors from one or more portions of the main pipe and the bottom plate. Depending on the frame configuration, it may be at least theoretically possible to operate the straddle-ridden vehicle of FIG. 4 in a limited fashion without a stress-bearing member placed in the region depicted at 401, provided an alternative power source is available; however, it is not anticipated that the straddle-ridden vehicle would withstand the forces of regular use over a duration, use at high speeds, or use on rough terrain. For such purposes, additional reinforcement may be necessary.

Figure 5:
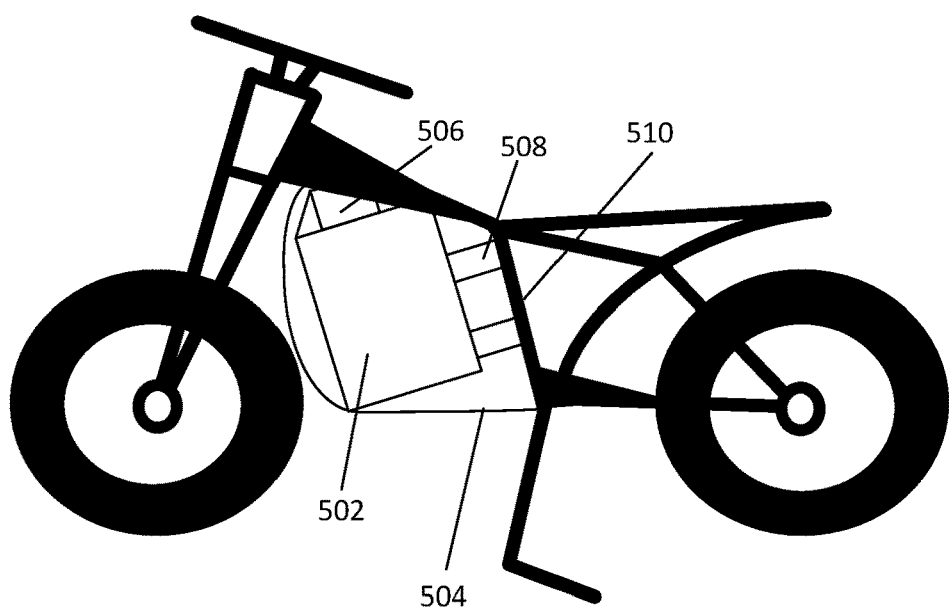
FIG. 5 depicts a side view of a straddle-ridden vehicle with a frame configured for a motor as a stress-bearing member, absent the motor.

FIG. 5 depicts a side view of a straddle-ridden vehicle with a frame configured for a motor as a stress-bearing member, absent the motor. The frame stiffener 502 is inserted generally in the region in which a stress-bearing motor had been present. The frame stiffener may be connected to the straddle-ridden vehicle frame via one or more top mounting elements 506, which may be configured to attach to the main pipe and/or the head pipe, and via one or more rear mounting elements 508, which may be configured to attach to the bottom plate and/or the rear down tube 510. One or more wrapper plates 504 may optionally be attached. The one or more optional wrapper plates 504 may be designed as a covering for the frame stiffener, for aesthetics, for aerodynamics, or otherwise. The one or more wrapper plates 504 may attach to at least one of the frame stiffener, the bottom plate, the rear down tube 510, the main pipe, or the head pipe.

Figure 6:
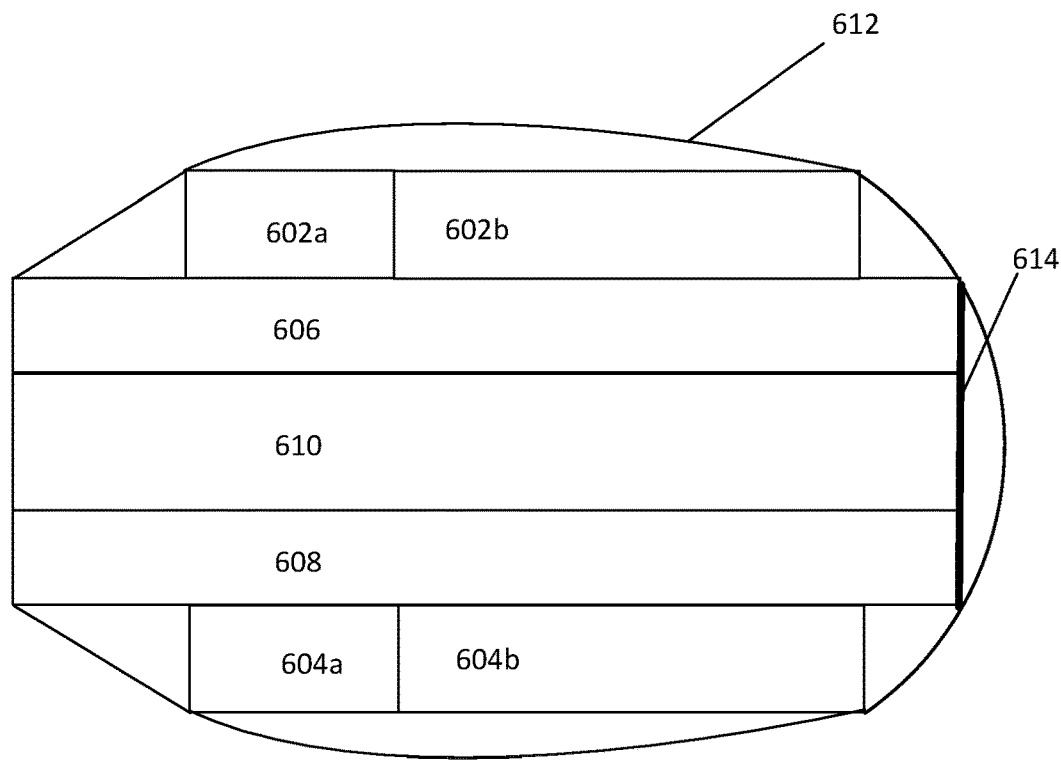
FIG. 6 shows a top view of a plurality of compartments configured as a stress-bearing member, according to an aspect of the disclosure.

FIG. 6 shows a top view of a plurality of compartments configured as a stress-bearing member, according to an aspect of the disclosure. The frame stiffener may include a left vertical plate 606, a right vertical plate 608, a front vertical plate 614, a center compartment region 610, one or more optional left compartments 602a and 602b, and one or more optional right compartments 604a and 604b. The center compartment region 610 may be defined at least by the left vertical plate 606, the right vertical plate 608, and the front vertical plate 614. The center compartment 610 may be further defined by a rear vertical plate (not pictured), opposite the front vertical plate 614. The one or more wrapper plates 612 may be configured to extend from a rear portion of the left vertical plate 606 to a rear portion of the right vertical plate 608, thereby encapsulating or wrapping around at least the frame stiffener. The shape of the one or more wrapper plates 612 may be selected based on any characteristic such as, but not limited to, design, aesthetics, aerodynamics, protection of the frame stiffener, protection of one or more optional compartments, and/or protection of the frame.

According to one aspect of the Disclosure, the frame stiffener may be formed from a system of vertical and horizontal plates intersecting and joined or otherwise solidified during the manufacturing process. From the view of the driver represented in FIG. 6, a left vertical plate 606 and a right vertical plate 608 attach to the upper frame member of the given straddle-ridden vehicle where the brackets for the original ICE attached (see FIGS. 7, 704 and 710), and connecting to the lower rear ICE assembly mounting brackets on the existing lower frame (See FIGS. 7, 704 and 710).

Figure 7:
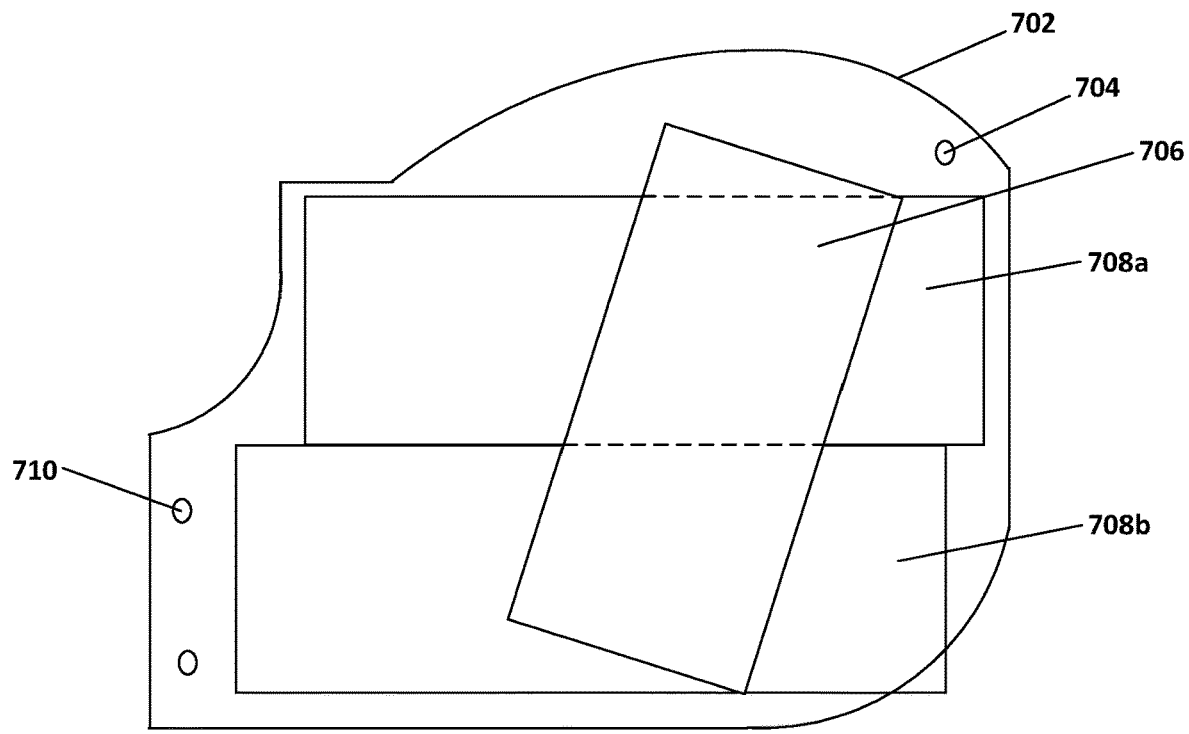
FIG. 7 shows a side view of a plurality of compartments configured as a stress-bearing member, according to an aspect of the disclosure.

FIG. 7 shows a side view of a container divided into a plurality of container regions, configured as a stress-bearing member, according to an aspect of the disclosure. Although according to some configurations, the frame stiffener may be mounted in two places to the frame, such that a first portion of the frame stiffener is attached to a front portion of the frame, and a rear portion of the frame stiffener is attached to a rear portion of the frame, the frame stiffener may alternatively be mounted to the frame via one or more optional side compartments. In this case, the frame stiffener 706 is mounted on a straddle-ridden frame (not pictured), such that the upper right portion of the frame stiffener 706 is attached to a front portion of the frame, via a mounting bracket (not pictured), and the lower left portion of the frame stiffener is attached to a rear portion of the frame via at least one of an additional side compartment and/or mounting bracket (not pictured). Two additional optional side compartments 708a and 708b are depicted substantially horizontally arranged with respect to the frame stiffener 706. The two side compartments are fixedly attached to the frame stiffener to allow distribution of forces from a top front portion of the frame stiffener through one or more of the side compartments 708a or 708b. The upper front portion of this assembly is configured to mount to a front portion of the frame via one or more mounting bolts 704 and to the rear portion of the frame also via one or more mounting bolts 710. One or more wrapper plates 700 are arranged around the assembly to protect the assembly, to provide for increased aerodynamics, to improve aesthetics, or otherwise.

Figure 8:
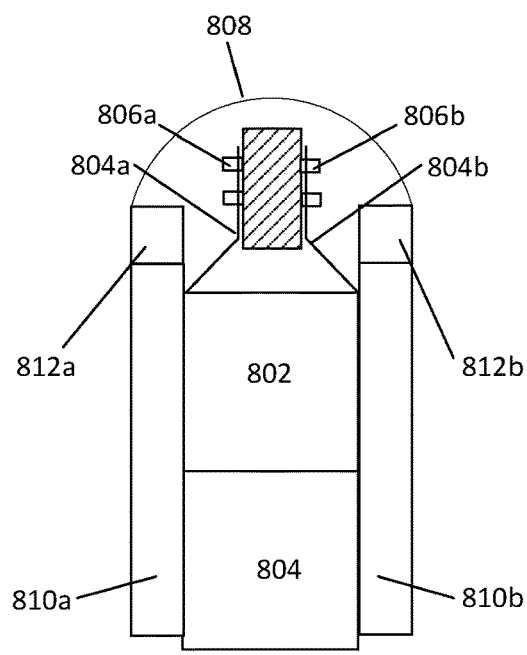
FIG. 8 shows a front view of a plurality of compartments configured as a stress-bearing member, according to an aspect of the disclosure.

FIG. 8 shows a front view of a container divided into a plurality of container regions configured as a stress-bearing member, according to an aspect of the disclosure. In this configuration, the frame stiffener is connected to the straddle-ridden vehicle frame, either directly or via one or more mounting plates. In this configuration, the one or more optional side compartments are provided for additional storage, but provide little or no stress transfer between a first portion of the frame and a second portion of the frame. According to this configuration, the frame stiffener is depicted in two sections 802 and 804. The frame stiffener may include a single container; however, the frame stiffener's container may be separated into one or more smaller container regions or compartments by means of one or more dividing structures. Such dividing structures may increase content stability by creating container regions designed for the spatial requirements of their contents, such as for a specific battery or specific fuel cell. The one or more container regions as defined by the container and/or the one or more dividing structures may be specifically configured for one or more batteries or fuel cells, and based on the geometrics of any particular straddle-ridden vehicle frame. In this case, frame stiffener 802 is connected to the frame via mounting plates/mounting brackets 804a and 804b. The connection may be achieved via one or more mounting bolts, such as 806a and 806b. Left and right side compartments 810a and 810b, respectively, may be mounted to the container/container regions/frame stiffener 802 and/or 804 to provide additional storage. The optional side compartments may be further divided by means of a dividing structure, so as to create one or more additional side compartments, as depicted herein as 812a and 812b. Depending on the desired configuration, the optional side compartments may be stress-bearing or non-stress-bearing. That is, the optional side compartments may be configured to be fixedly mounted to the container/container regions, and the side bearing compartments may be rigidly connected to one or more portions of the frame such as to distribute forces along the frame stiffeners. Alternatively, the frame connections may be established exclusively along the frame stiffeners 802 and 804, such that the optional side compartments functionally transmit little or no forces between regions of the frame. One or more wrapper panels 808 may be used to cover at least one of the frame stiffeners 802 and 804, the one or more side compartments 810a, 810b, 812a, 812b, the mounting plates/mounting brackets 804a and 804b, or the mounting bolts 806a and 806b.

As shown in FIG. 8, the container is defined by vertical plates (corresponding to side and front plates and any dividing plates) and horizontal plates (corresponding to top and bottom plates and any dividing plates) that define one or more container regions shown as the upper center container region and the lower center container region. The container regions as described herein may alternatively be considered to be compartments. Additional left and right compartments 810a, 812a, 810b, 812b may be defined in the present Disclosure with plates generally perpendicular to the vertical plates, with a wrapper plate 808 surrounding the center, right and left compartments. The center container regions may have fixed or adjustable plates defining the boundaries of the container regions. The container may or may not be fitted with a top cover matching in design the dimensions of the modification device described herein.

Figure 9:
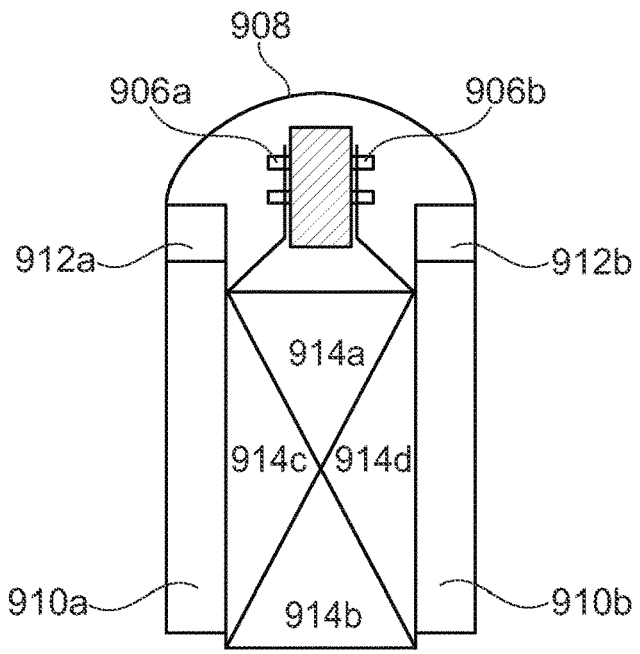
FIG. 9 shows a front view of a plurality of compartments configured as a stress-bearing member, according to another aspect of the disclosure.

FIG. 9 shows a front view of a plurality of container regions configured as one or more stress-bearing members, according to another aspect of the disclosure. The frame stiffener may include a container that is divided into any number of container regions or subcompartments using one or more dividing structures. Although typically depicted herein as cubic compartments, the compartments may be configured as a cuboid, or any other geometric shape. As depicted herein, the dividing members are inserted diagonally to create triangular-shaped compartments 914a, 914b, 914c, and 914d. The shape of said compartments may be created based on any desired criteria, including, but not limited to, dimensions of a fuel cell, a chemical battery, a rechargeable battery, or any device for energy storage and/or supply. Alternatively, dividing members may be inserted to stabilize or improve weight-bearing abilities. In this manner, for example, diagonal dividing members may be rigidly affixed to the corners of a cuboid frame stiffener, thereby strengthening the compartment and improving resiliency. As in other examples, the frame stiffener may be rigidly attached to a front portion of the frame, whether directly attached or through one or more mounting members. The mounting may be achieved, for example, using one or more mounting bolts 906a and 906b, the frame stiffeners may be configured with one or more optional side compartments 910a, 910b, 912a, 912b, which may be configured in a manner so as to be stress-bearing or non-stress-bearing. Optionally, at least one of the aforementioned elements may be covered by one or more wrapper plates 908.

Although dividing elements are described herein as dividing the container into one or more container regions, and compartment is generally used herein to describe an optional bounded area attached to a side of the container, it is noted that the compartments described and depicted according to various aspects of the disclosure may also or alternatively be formed by placing the one or more dividing elements within the container. For example, placement of a vertical dividing element within the container may create a side compartment.

In accordance with the present Disclosure, the center plates and number of container regions and/or compartments may also vary, including a variation with an interior "X" shape (defined by 914a, 914b, 914c, and 914d) and/or with only the center compartments as represented in FIG. 9. The plates may or may not contain channels and passageways for the movement of air within the device, or also for the location of wires, tubing or other components.

Figure 10:
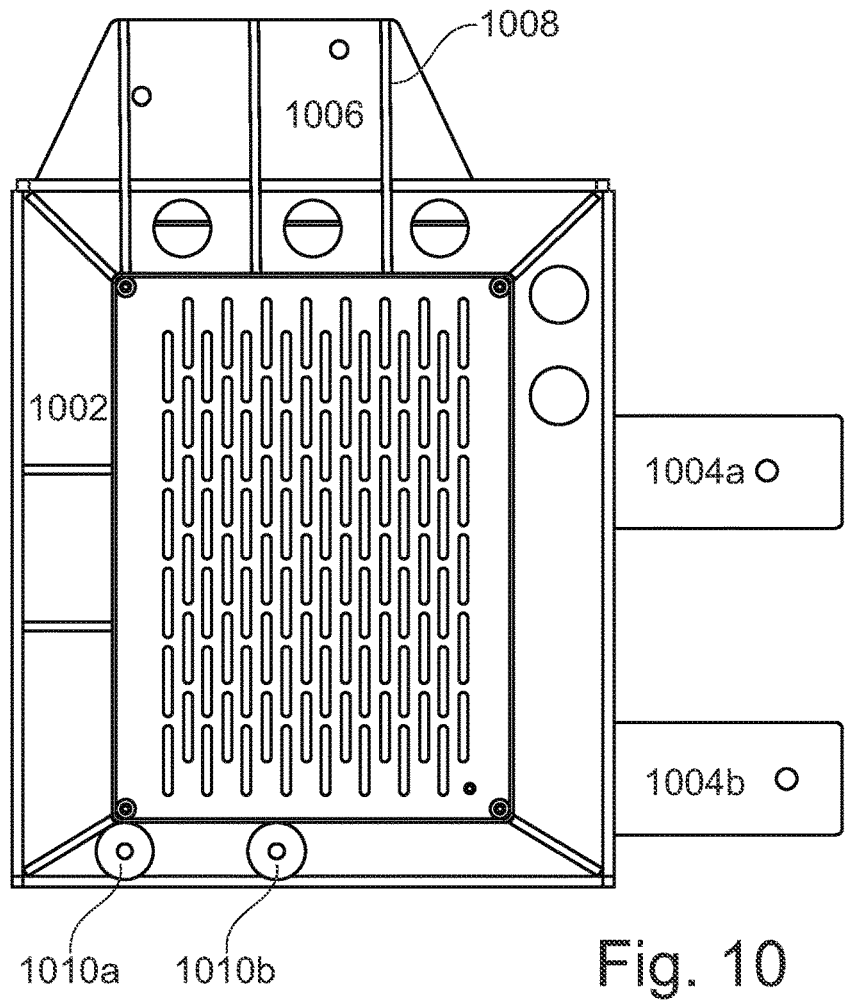
FIG. 10 shows a side view of a compartment as a stress-bearing member according to an aspect of the disclosure.

FIG. 10 shows a side view of a frame stiffener as a stress-bearing member according to an aspect of the disclosure. The frame stiffener may include one or more plates, welded, riveted, epoxied, or otherwise rigidly connected to one another. The left side plate 1002 may, in this manner, be rigidly connected to a front plate, a backplate, a top plate, and a bottom plate, each of which may also be connected to a right side plate (not pictured). The top plate may be connected to one or more upper mounting plates 1006, which are configured to be connected to a main pipe, a head pipe, or otherwise a front region of a straddle-ridden vehicle frame. The upper mounting plates 1006 and/or any panels of the frame stiffener, including, a top plate, a bottom plate, a front plate, a rear plate, a left side plate, or a right side plate, may be reinforced with webbing or any other reinforcement material 1008. Such webbing or other reinforcement material may impart additional resiliency and inhibit deformation due to operational stress. The rear panel and/or one or more side panels may be rigidly connected to one or more rear mounting plates 1004a and 1004b, which may be configured to connect to a rear region of the straddle-ridden vehicle frame, including, but not limited to, a sub tube holder and/or a bottom plate. Said connections to the frame may be achieved through any known means including, but not limited to, one or more mounting bolts.

The frame stiffener may optionally be configured with one or more mounting points 1010a and 1010b, to which one or more additional features may be mounted. Said one or more additional features may include, but are not limited to any one or more of foot pegs, foot operated controls, and brake levers. In this manner, the any one or more of foot pegs, foot operated controls, and brake levers may be mounted directly to the frame stiffener or its container. This may provide for simplicity of connection of the one or more additional features, particularly in situations in which the one or more additional features had previously been connected to the ICE.

Figure 11:
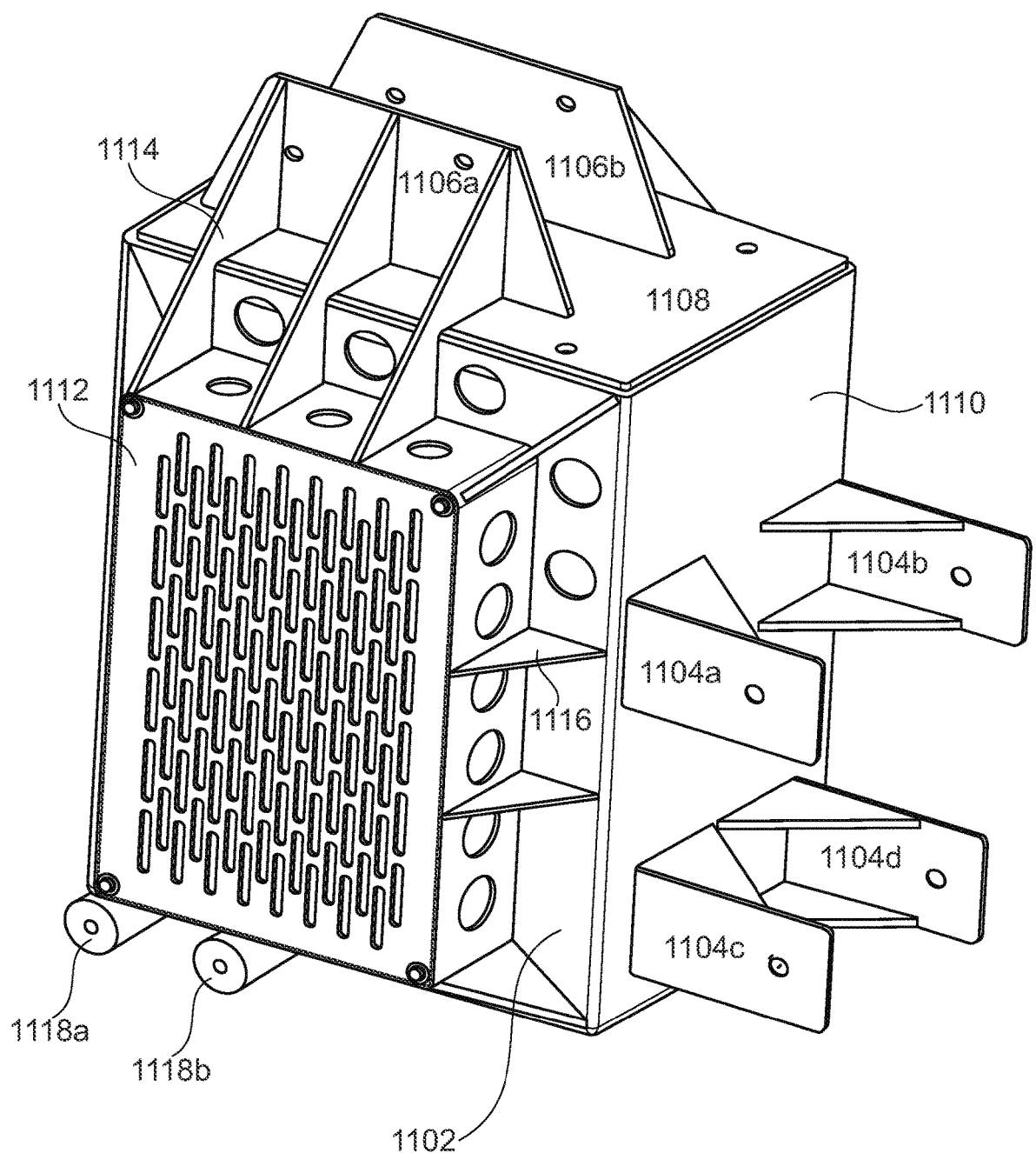
FIG. 11 shows a three-dimensional view of a compartment as a stress-bearing member according to an aspect of the disclosure.

FIG. 11 shows a three-dimensional view of a frame stiffener according to an aspect of the disclosure. A left panel of the frame stiffener container 1102 may be configured opposite a right panel (not shown). The left and right panels may be rigidly connected to a rear panel 1110, a top panel 1108, a front panel (not shown), and a bottom panel (not shown). The top panel 1108 and/or one or more of the side panels 1102 and opposite may be connected to one or more upper mounting plates 1106a and 1106b, which may be configured to connect to a front upper portion of a straddle-ridden vehicle frame, such as, but not limited to, a main pipe and/or a head pipe. The connection may be achieved using one or more mounting bolts, which may be a factory part of a straddle-ridden vehicle. Each of the upper mounting plates 1106a and 1106b may be configured with one or more holes which are placed so as to match with or otherwise establish a suitable connection to one or more mounting bolts of the straddle-ridden vehicle. The rear panel 1110 and/or at least one side panel 1102 or opposite (not pictured) may be attached to one or more rear mounting plates 1104a, 1104b, 1104c, 1104d. Any number of rear mounting plates 1104a, 1104b, 1104c, 1104d may be used, as needed for stability and/or necessary transmission of force. The rear mounting plates 1104a, 1104b, 1104c, 1104d may be configured with one or more holes to permit a rigid connection to the frame using one or more mounting bolts (not shown). Said mounting bolts may be mounting bolts that are originally present on said straddle-ridden vehicle. The frame stiffener's container may be configured with one or more optional side compartments 1112. The optional side compartments 1112 may be stress-bearing or non-stress-bearing. A stress-bearing side compartment may be achieved through a rigid connection to the main frame stiffener and/or an otherwise established connection between the frame and the frame stiffener. In this example, and according to one aspect of the disclosure, the connection is established through one or more connection fins 1114, which connect the upper mounting plate to the side compartment. In a similar manner, the side compartment may be connected to one or more rear mounting plates (connection not shown) using one or more connection fins. One or more connection fins may be further used to connect via one or more side compartments to the main frame stiffener, as depicted in 1116.

As stated above, the frame stiffener may optionally be configured with one or more mounting points 1118a and 1118b, to which one or more additional features such as any one or more of foot pegs, foot operated controls, and brake levers, may be mounted.

Figure 12:
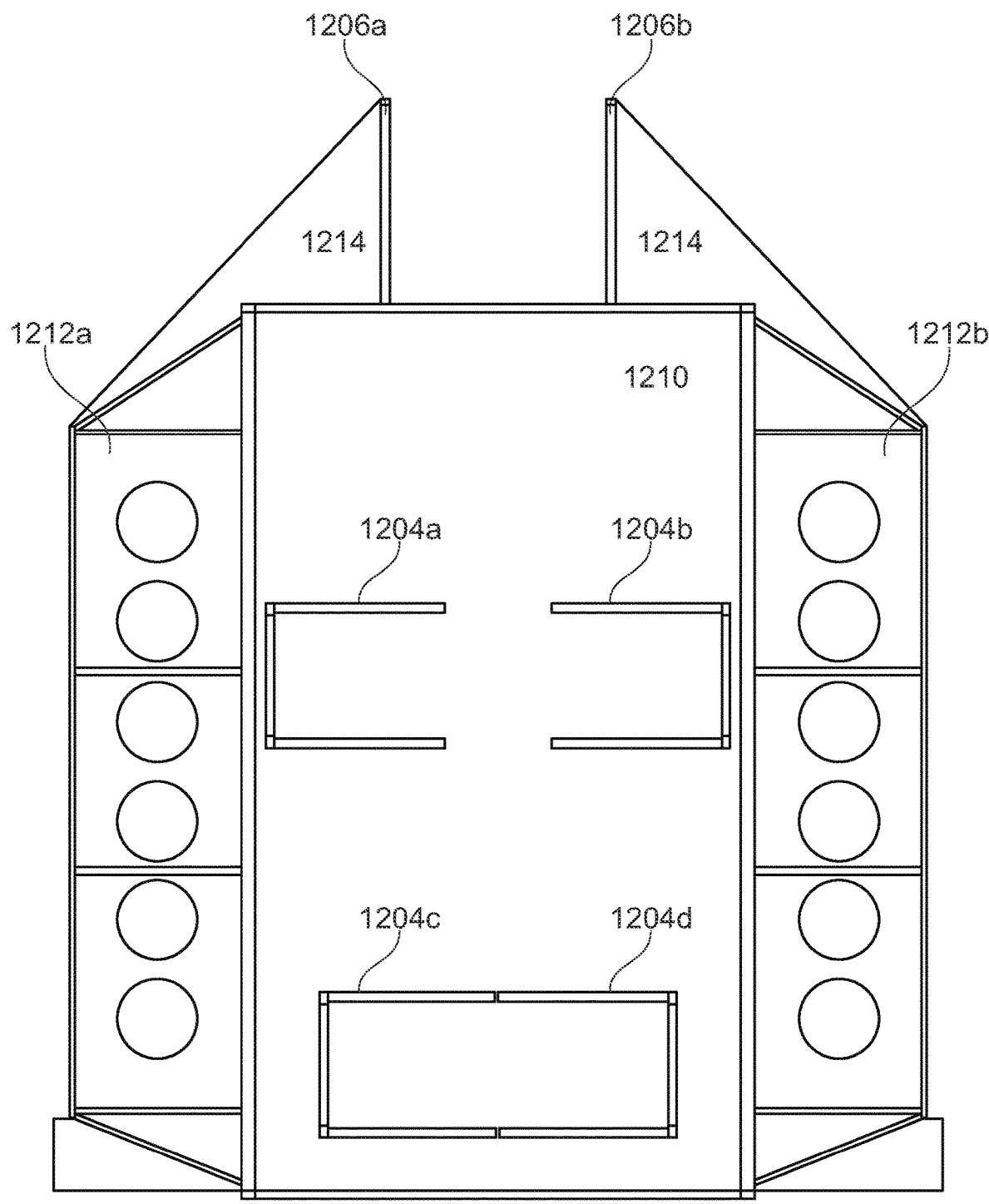
FIG. 12 shows a rear view of a compartment as a stress-bearing member according to an aspect of the disclosure.

FIG. 12 shows a rear view of a frame stiffener as a stress-bearing member according to an aspect of the disclosure. Depicted herein is the rear panel 1210 of the frame stiffener, and an optional left compartment 1212a, and an optional right compartment 1212b, a left upper mounting plate 1206a and a right upper mounting plate 1206b, and rear mounting plates 1204a, 1204b, 1204c, and 1204d. According to this aspect of the disclosure, the upper mounting plates 1206a and 1206b may be connected directly to a top plate of the frame stiffener and/or may be connected via one or more fins 1214 to the one or more optional side compartments, such as the left side compartment 1212a and the right side compartment 1212b.

FIG. 13 shows a method of straddle-ridden vehicle frame stiffening, comprising removing a stressed-member combustion engine from a first frame segment of the straddle-ridden vehicle and a second frame segment of the straddle ridden vehicle 1302; mounting a frame stiffener to the first frame segment and the second frame segment 1304, the frame stiffener comprising: a support structure for stiffening the straddle-ridden vehicle frame 1306, the support structure comprising a first side; and a second side, adjacent to the first side 1308; a first mounting element for removably mounting the support structure to the straddle-ridden vehicle frame, the first mounting element being attached to the first side 1310; a second mounting element for removably mounting the support structure to the straddle-ridden vehicle frame, the second mounting element being attached to the second side 1312; wherein the first side and the second side are rigidly connected to one another 1314.

Many straddle-ridden vehicles are equipped with a stressed-member motor, which is fixedly connected to the straddle-ridden vehicle frame in at least two places and becomes a stressed-member. In contrast with straddle-ridden vehicles having non-stressed-member motors, which can generally be removed without impairing the structural integrity of the frame, these straddle-ridden vehicles are generally reliant on a force-supporting structure in the location of the motor to maintain structural integrity. This presents significant problems in attempting to update or retrofit a straddle-ridden vehicle with an alternative energy source.

Straddle-ridden vehicle operators may desire to convert the straddle-ridden vehicle from operating primarily pursuant to a petroleum-fuel based motor to an alternative energy source. Such alternative energy sources may include, but are not limited to, electric motors and motors operating according to one or more fuel cells. Such a conversion permits removal of the conventional combustion engine; however, as stated above, in the event that the combustion engine is a stressed-member, removal of the combustion engine impairs the vehicle's structural integrity. As such, it becomes necessary to replace the conventional combustion engine with a stress-bearing structure.

Many alternative power sources require a battery or fuel source for energy storage. Such conversion of a combustion engine to an alternative fuel source may require allocation of the space on or within the straddle-ridden vehicle to accommodate a battery or fuel source for operation. The frame stiffener described herein includes a container or storage area, in which a battery or fuel cell and energy/fuel storage may be housed. The container itself is designed to be stress-bearing and provide the necessary support to maintain the structural integrity of the straddle-ridden vehicle frame. The container may be designed with one or more hollow storage areas to store one or more batteries, fuel cells, and/or other power sources.

The frame stiffener is configured to mount to the straddle-ridden vehicle frame in at least two places. Typically, a stressed-member motor is installed generally in place of the front down tube of the frame. Depending on the configuration, a stressed-member motor may be installed on a frame lacking any portion of a front down tube, or the frame may include any of an upper portion of the front down tube, a lower portion of the front down tube, or a combination thereof.

The frame stiffener described herein may be designed to be mounted within the available space created by removal of the stressed-member motor and/or transmission. That is, in the event that a front down tube is not present within the remaining frame, the frame stiffener may be mounted generally to a region corresponding to the head pipe or main pipe along the top, and to the sub tube holder or bottom plate along the bottom or rear. In the event that removal of the stressed-member motor reveals one or more of an upper portion of the front down tube or a lower portion of the front down tube, the frame stiffener may be mounted or affixed to the one or more remaining portions of the front down tube.

The dimensions of the frame stiffener may be altered based on the dimensions of the frame and/or the corresponding stressed-member motor. Straddle-ridden vehicles have been, and continue to be, manufactured in a variety of sizes and configurations. The concepts disclosed herein, and the resulting frame stiffener, may be adjusted based on a particular make or model of a straddle-ridden vehicle, and/or the available space created upon removal of an internal combustion engine.

According to one aspect of the disclosure, the container, and therefore the frame stiffener, may include a top, bottom, front, back, left side, and right side. The top of the container may correspond to a surface or portion of the container at which a connection to the head pipe or main pipe is established. The bottom of the container may correspond to a surface or portion of the container at which a connection to the sub tube holder or bottom plate is established. The front of the container may correspond to a portion of the container configured to face the front of a straddle-ridden vehicle. The back or rear of the container may correspond to a portion of the container configured to face the back or rear of a straddle-ridden vehicle.

The frame stiffener may be attached to a straddle-ridden vehicle using any means whatsoever, without limitation. According to one aspect of the disclosure, the frame stiffener may be permanently affixed to a straddle-ridden vehicle, such as by welding. According to another aspect of the disclosure, the frame stiffener may be affixed to the straddle-ridden vehicle by one or more mounting bolts. The straddle-ridden vehicle may have previously employed one or more mounting bolts to fix the combustion engine to the straddle-ridden vehicle frame, or by any other removable means. The same or substantially similar mounting bolts may be utilized to attach the frame stiffener to the straddle-ridden vehicle frame. Use of said bolts may offer the advantage of requiring reduced modification to the straddle-ridden vehicle frame, as the pre-existing holes and/or bolts may be used for the frame stiffener. This may reduce or eliminate the need for cutting or welding of the frame.

According to one aspect of the disclosure, the frame stiffener may be configured to connect to a specific make or model of straddle-ridden vehicle, based on the available space for the frame stiffener and placement of mounting bolts. The connecting portions of the frame stiffener may be configured to reach the pre-existing mounting bolts of the straddle-ridden vehicle, and the connecting portions may be configured with holes to accept the mounting bolts, said holes being placed to correspond to the pre-existing mounting bolt locations.

According to another aspect of the disclosure, the connecting portions of the frame stiffener may be configured with a plurality of mounting bolt holes, such holes being placed to accommodate the placement of mounting bolts on a plurality of makes and/or models of straddle-ridden vehicles. That is, two or more straddle-ridden vehicles of differing makes or models may have differing mounting pin configurations, and the connecting portions of the frame stiffener may include holes to accommodate either or any of the plurality of straddle-ridden vehicle mounting bolt configurations.

The container of the frame stiffener may be in any form whatsoever, said form being limited only by available space as defined by the straddle-ridden vehicle frame and connecting parts. According to one aspect of the disclosure, the container may be in a substantially cuboid form. The substantially cuboid form may include six sides. The substantially cuboid form may be cubic. The substantially cuboid form may have one of an x-axis, a y-axis or z-axis that is substantially elongated compared to at least one remaining axis, such that the front, back, or side panels are substantially rectangular.

The container of the frame stiffener may include one or more dividing elements. These dividing elements may divide the container into two or more compartments. The dividing elements may be in any form whatsoever, without limitation. According to one aspect of the disclosure, the dividing element may be a panel or plate. Said panel or plate may divide entirely one compartment from another. According to another aspect of the disclosure, the dividing element may create less than a complete division of one compartment from another. In this case, the dividing element may be a panel or plate covering less than an entire width or depth of the container. The dividing element may be arranged substantially parallel to a top or bottom portion of the container. The dividing element may include one or more panels, plates, bars, wires, screens, panels, or otherwise.

The container may include any material without limitation. According to one aspect of the disclosure, the container may include one or more materials which the straddle-ridden vehicle frame also includes. For example, straddle-ridden vehicle frames may include, for example and without limitation, aluminum, steel, titanium, carbon fiber, or a combination thereof. It may be desirable to use one or more of these materials in creating the container as described herein. It may be desirable to use one or more of these materials for the compartment, said one or more materials also corresponding to the materials used in the frame of the desired make and/or model of straddle-ridden vehicle.

The manufacturing process known as 3D printing may also be used to create one or more components of the frame stiffener. As 3D printing becomes more widespread, and as new and ever more robust materials are employed in 3D printing technology, it has become possible to print materials with suitable hardness and resilience to be used in a straddle-ridden vehicle frame. It is anticipated that the suitability of 3D printing materials for straddle-ridden vehicle frames will continue to increase. As such, it is anticipated that 3D printing may be used to create one or more components of the frame stiffener as described herein. For example, 3D printing may be used to create the container, the optional one or more side compartments, and/or any mounting brackets. In the event that 3D printing is used to create any one or more elements of the frame stiffener, any material may be used in such 3D printing process. Candidate materials for 3D printing include, but are not limited to Acrylonitrile Butadiene Styrene, Polylactic Acid, nylon, polypropylene, 3D printing resin, Acrylonitrile Styrene Acrylate, polycarbonate, Polyethylene terephthalate, Polyethylene terephthalate glycol-modified, high impact polystyrene, Polyether ether ketone, Thermoplastic Polyurethane, Polyoxymethylene, Polyvinyl Alcohol, ULTEM, or any combination thereof.

As described herein, the frame stiffener may include one or more optional side compartments. The side compartments may be placed on the left and/or right side of the container, as desired, and as permitted by available space. The site compartments may be fixedly connected to the container, or removably connected to the container. In a removable connection, the side compartment may facilitate additional storage. It may be desirable to have additional storage places to house one or more batteries or fuel cells, or simply to provide general storage for any purpose whatsoever. Alternatively, the one or more side compartments may be fixedly connected to the container, such as by bolting, adhesion, welding, or otherwise. Such a fixed connection may permit the one or more optional side compartments to become weight-bearing. That is, the one or more optional side compartments may be connected to the frame, whether directly or indirectly, such that some or all of the force transmitted from the first portion of the frame to the second portion of the frame is transmitted through the one or more side compartments. The force may be transmitted through the one or more side compartments through the connective means used to connect the side compartment to the container, such as the aforesaid welding, mounting bolts, adhesion or otherwise. The one or more optional side compartments may be further configured with reinforcement fins and/or webbing to reinforce the connection between the one or more optional side compartments and at least one of the container or one or more mounting brackets.

The frame stiffener may be configured with an optional one or more wrapper plates. The term wrapper plate is used generally to refer to one or more coverings for one or more portions of the frame stiffener. The wrapper plate may include any material whatsoever including, but not limited to, steel, aluminum, titanium, carbon fiber, plastic, or any other material, without limitation. The wrapper plate may be configured to surround the container. The wrapper plate may extend from the first connecting portion of the straddle-ridden vehicle frame to the second connecting portion of the straddle-ridden vehicle frame. The shape of the wrapper plate may be selected based on any criteria whatsoever including, but not limited to, any one or more of aerodynamics, protection from weather, separation of container or compartments from one or more body parts of a driver, aesthetics, or otherwise.

The weight-bearing members of the frame stiffener, including but not limited to any of the container, the one or more optional compartments, and/or the mounting elements, may be designed, manufactured and/or implemented based on the force distribution requirements of a given straddle-ridden vehicle implementation. Various makes and models of straddle-ridden vehicles may be manufactured in differing sizes and with differing frame configurations. The combustion engine to be removed may be of a variety of sizes, and the resulting space to be filled by the frame stiffener may similarly be of a variety of sizes. If a motor is installed to replace the combustion engine, the replacement motor may be configured to propel the straddle-ridden vehicle at a variety of velocities, and providing a variety of acceleration forces. As a result, the combination of at least these factors, the frame size and shape, the replacement motor, that and the dimensions of the space to be occupied by the frame stiffener, may require a variety of frame stiffener configurations. That is, although a particularly robust frame stiffener may be a suitable weight-bearing member for many implementations, it may be desirable to construct smaller or more lightweight frame stiffeners for other implementations which require the frame stiffener to withstand less force. The principles described herein are adjustable and configurable to create a frame stiffener of a variety of lengths, widths, depths, thicknesses, and/or configurations to withstand the requisite amount of force, (whether compressive, tensile, sheer, or torsion stress), and to do so within the space available as defined by the frame and remaining straddle-ridden vehicle parts.

Additional aspects of the disclosure are shown in the following examples:

In Example 1, a straddle-ridden vehicle is disclosed including a frame, including a first frame segment and a second frame segment, a support structure for stiffening the frame, the support structure including a first mounting element for removably mounting the support structure to the first frame segment; and a second mounting element for removably mounting the support structure to the second frame segment; wherein the support structure includes a container; and wherein the container is a weight-bearing member between the first frame segment and the second frame segment.

In Example 2, the straddle-ridden vehicle of Example 1 is disclosed, wherein the first frame segment and the second frame segment are arranged with a void between the first frame segment and the second frame segment, and wherein the support structure occupies the void when mounted to the first frame segment and the second frame segment.

In Example 3, the straddle-ridden vehicle of Examples 1 or 2 is disclosed, wherein the container is a container for holding one or more electrical components.

In Example 4, the straddle-ridden vehicle of any one of Examples 1 to 3 is disclosed, wherein the first mounting element is configured to removably mount to the first frame segment using one or more mounting bolts.

In Example 5, the straddle-ridden vehicle of any one of Examples Example 1 to 4 is disclosed, wherein the second mounting element is configured to removably mount to the second frame segment using one or more mounting bolts.

In Example 6, the straddle-ridden vehicle of any one of Examples 1 to 5 is disclosed, wherein the container has a substantially cuboid form.

In Example 7, the straddle-ridden vehicle of any one of Examples 1 to 6 is disclosed, further including at least one dividing element within the container, for dividing the container into a first container portion and a second container portion.

In Example 8, the straddle-ridden vehicle of Example 7 is disclosed, wherein at least one dividing element is substantially parallel to a top portion or a bottom portion of the container.

In Example 9, the straddle-ridden vehicle of any one of Examples 1 to 8 is disclosed, wherein the first mounting element includes one or more holes arranged to correspond to one or more mounting regions of the first frame segment.

In Example 10, the straddle-ridden vehicle of any one of Examples 1 to 9 is disclosed, wherein the second mounting element includes one or more holes arranged to correspond to one or more mounting regions of the second frame segment.

In Example 11, the straddle-ridden vehicle of any one of Examples 1 to 10 is disclosed, wherein the support structure includes at least one of aluminum, steel, titanium, carbon fiber, or any combination thereof.

In Example 12, the straddle-ridden vehicle of any one of Examples 1 to 10 is disclosed, wherein the support structure is printed in a 3D printing process.

In Example 13, the straddle-ridden vehicle of Example 12 is disclosed, wherein the support structure includes Acrylonitrile Butadiene Styrene, Polylactic Acid, nylon, polypropylene, 3D printing resin, Acrylonitrile Styrene Acrylate, polycarbonate, Polyethylene terephthalate, Polyethylene terephthalate glycol-modified, high impact polystyrene, Polyether ether ketone, Thermoplastic Polyurethane, Polyoxymethylene, Polyvinyl Alcohol, ULTEM, or any combination thereof.

In Example 14, the straddle-ridden vehicle of any one of Examples 1 to 13 is disclosed, wherein the first frame segment includes at least one of a head pipe segment, a main pipe segment, a front down tube segment, or any combination thereof.

In Example 15, the straddle-ridden vehicle of any one of Examples 1 to 14 is disclosed, wherein the second frame segment includes at least one of a sub tube holder, a bottom plate, or any combination thereof.

In Example 16, the straddle-ridden vehicle of any one of Examples 1 to 15 is disclosed, wherein the support structure further includes a side compartment, attached to a side of the container.

In Example 17, the straddle-ridden vehicle of Example 16 is disclosed, wherein the side compartment is fixedly mounted to the container.

In Example 18, the straddle-ridden vehicle of Example 16 or 17 is disclosed, wherein the first mounting element is further connected to the side compartment.

In Example 19, the straddle-ridden vehicle of any one of Examples 16 to 18 is disclosed, wherein the second mounting element is further connected to the side compartment.

In Example 20, the straddle-ridden vehicle of any one of Examples 16 to 19 is disclosed, further including one or more reinforcement fins between the side compartment and at least one of the first mounting element, the second mounting element, the container, or any combination thereof.

In Example 21, a straddle-ridden vehicle frame stiffener is disclosed, including: a support structure for stiffening the straddle-ridden vehicle frame, the support structure including a first side; and a second side, adjacent to the first side; a first mounting element for removably mounting the support structure to the straddle-ridden vehicle frame, the first mounting element being attached to the first side; a second mounting element for removably mounting the support structure to the straddle-ridden vehicle frame, the second mounting element being attached to the second side; wherein the first side and the second side are rigidly connected to one another.

In Example 22, the straddle-ridden vehicle frame stiffener of Example 21 is disclosed, wherein the support structure includes a container for holding one or more electrical components.

In Example 23, the straddle-ridden vehicle frame stiffener of Example 22 is disclosed, wherein the first side and the second side are two sides of the container.

In Example 24, the straddle-ridden vehicle frame stiffener of any one of Examples 21 to 23 is disclosed, wherein the first side and the second side are connected to one another at a predetermined angle.

In Example 25, the straddle-ridden vehicle frame stiffener of any one of Examples 21 to 24 is disclosed, wherein the first mounting element is configured to removeably mount to a first frame segment of the straddle-ridden vehicle frame.

In Example 26, the straddle-ridden vehicle frame stiffener of any one of Examples 21 to 25 is disclosed, wherein the second mounting element is configured to removably mount to a second frame segment of the straddle-ridden vehicle frame.

In Example 27, the straddle-ridden vehicle frame stiffener of Example 25 or 26 is disclosed, wherein the first mounting element is configured to removably mount to the first frame segment using one or more mounting bolts.

In Example 28, the straddle-ridden vehicle frame stiffener of any one of Examples 25 to 27 is disclosed, wherein the second mounting element is configured to removably mount to the second frame segment using one or more mounting bolts.

In Example 29, the straddle-ridden vehicle frame stiffener of any one of Examples 22 to 28 is disclosed, wherein the container has a substantially cuboid form.

In Example 30, the straddle-ridden vehicle frame stiffener of any one of Examples 22 to 29 is disclosed, further including at least one dividing element within the container, for dividing the container into a first container region and a second container region.

In Example 31, the straddle-ridden vehicle frame stiffener of Example 30 is disclosed, wherein the at least one dividing element is substantially parallel to a top portion or a bottom portion of the container.

In Example 32, the straddle-ridden vehicle frame stiffener of any one of Examples 25 to 31 is disclosed, wherein the first mounting element includes one or more holes arranged to correspond to one or more mounting regions of the first frame segment.

In Example 33, the straddle-ridden vehicle frame stiffener of Example 25 to 32 is disclosed, wherein the second mounting element includes one or more holes arranged to correspond to one or more mounting regions of the second frame segment.

In Example 34, the straddle-ridden vehicle frame stiffener of any one of Examples 21 to 33 is disclosed, wherein the support structure includes at least one of aluminum, steel, titanium, carbon fiber, or any combination thereof.

In Example 35, the straddle-ridden vehicle frame stiffener of any one of Examples 21 to 33 is disclosed, wherein the support structure is printed in a 3D printing process.

In Example 36, the straddle-ridden vehicle frame stiffener of Example 35 is disclosed, wherein the support structure includes Acrylonitrile Butadiene Styrene, Polylactic Acid, nylon, polypropylene, 3D printing resin, Acrylonitrile Styrene Acrylate, polycarbonate, Polyethylene terephthalate, Polyethylene terephthalate glycol-modified, high impact polystyrene, Polyether ether ketone, Thermoplastic Polyurethane, Polyoxymethylene, Polyvinyl Alcohol, ULTEM, or any combination thereof.

In Example 37, the straddle-ridden vehicle frame stiffener of any one of Examples 25 to 36 is disclosed, wherein the first frame segment includes at least one of a head pipe segment, a main pipe segment, a front down tube segment, or any combination thereof.

In Example 38, the straddle-ridden vehicle frame stiffener of any one of Examples 26 to 37 is disclosed, wherein the second frame segment includes at least one of a sub tube holder, a bottom plate, or any combination thereof.

In Example 39, the straddle-ridden vehicle frame stiffener of any one of Examples 22 to 38 is disclosed, wherein the support structure further includes a side compartment, attached to a side of the container.

In Example 40, the straddle-ridden vehicle frame stiffener of Example 39 is disclosed, wherein the side compartment is fixedly mounted to the container.

In Example 41, the straddle-ridden vehicle frame stiffener of Example 39 or 40 is disclosed, wherein the first mounting element is further connected to the side compartment.

In Example 42, the straddle-ridden vehicle frame stiffener of any one of Examples 39 to 41 is disclosed, wherein the second mounting element is further connected to the side compartment.

In Example 43, the straddle-ridden vehicle frame stiffener of any one of Examples 39 to 42 is disclosed, further including one or more reinforcement fins between the side compartment and at least one of the first mounting element or the second mounting element.

In Example 44, a method of straddle-ridden vehicle frame stiffening is disclosed, including removing a stressed-member combustion engine from a first frame segment of the straddle-ridden vehicle and a second frame segment of the straddle ridden vehicle; mounting a frame stiffener to the first frame segment and the second frame segment, the frame stiffener including: a support structure for stiffening the straddle-ridden vehicle frame, the support structure including a first side; and a second side, adjacent to the first side; a first mounting element for removably mounting the support structure to the straddle-ridden vehicle frame, the first mounting element being attached to the first side; a second mounting element for removably mounting the support structure to the straddle-ridden vehicle frame, the second mounting element being attached to the second side; wherein the first side and the second side are rigidly connected to one another.

In Example 45, the method of straddle-ridden vehicle frame stiffening of Example 44 is disclosed, wherein the support structure includes a container for holding one or more electrical components.

In Example 46, the method of straddle-ridden vehicle frame stiffening of Example 44 or 45 is disclosed, wherein the first mounting element is configured to removably mount to the first frame segment using one or more mounting bolts.

In Example 47, the method of straddle-ridden vehicle frame stiffening of any one of Examples 44 to 46 is disclosed, wherein the second mounting element is configured to removably mount to the second frame segment using one or more mounting bolts.

In Example 48, the method of straddle-ridden vehicle frame stiffening of any one of Examples 45 to 47 is disclosed, wherein the container has a substantially cuboid form.

In Example 49, the method of straddle-ridden vehicle frame stiffening of any one of Examples 45 to 48 is disclosed, wherein the container has at least one dividing element within the container, for partitioning the container into a first container region and a second container region.

In Example 50, the method of straddle-ridden vehicle frame stiffening of Example 49 is disclosed, wherein the at least one dividing element is substantially parallel to a top portion or a bottom portion of the container.

In Example 51, the method of straddle-ridden vehicle frame stiffening of any one of Examples 44 to 50 is disclosed, further including mounting the first mounting element to the straddle-ridden vehicle frame via one or more holes arranged to correspond to one or more mounting regions of the first frame segment.

In Example 52, the method of straddle-ridden vehicle frame stiffening of any one of Examples 44 to 51 is disclosed, further including mounting the second mounting element to the straddle-ridden vehicle frame via one or more holes arranged to correspond to one or more mounting regions of the second frame segment.

In Example 53, the method of straddle-ridden vehicle frame stiffening of any one of Examples 44 to 52 is disclosed, wherein the support structure includes at least one of aluminum, steel, titanium, carbon fiber, or any combination thereof.

In Example 54, the method of straddle-ridden vehicle frame stiffening of Example 44 to 52 is disclosed, wherein the support structure is printed in a 3D printing process.

In Example 55, the method of straddle-ridden vehicle frame stiffening of Example 54 is disclosed, wherein the support structure includes Acrylonitrile Butadiene Styrene, Polylactic Acid, nylon, polypropylene, 3D printing resin, Acrylonitrile Styrene Acrylate, polycarbonate, Polyethylene terephthalate, Polyethylene terephthalate glycol-modified, high impact polystyrene, Polyether ether ketone, Thermoplastic Polyurethane, Polyoxymethylene, Polyvinyl Alcohol, ULTEM, or any combination thereof.

In Example 56, the method of straddle-ridden vehicle frame stiffening of any one of Examples 44 to 55 is disclosed, wherein the first frame segment includes at least one of a head pipe segment, a main pipe segment, a front down tube segment, or any combination thereof.

In Example 57, the method of straddle-ridden vehicle frame stiffening of any one of Examples 44 to 56 is disclosed, wherein the second frame segment includes at least one of a sub tube holder, a bottom plate, or any combination thereof.

In Example 58, the method of straddle-ridden vehicle frame stiffening of any one of Examples 45 to 57 is disclosed, wherein the support structure further includes a side compartment, attached to a side of the container.

In Example 59, the method of straddle-ridden vehicle frame stiffening of Example 58 is disclosed, wherein the side compartment is fixedly mounted to the container.

In Example 60, the method of straddle-ridden vehicle frame stiffening of Example 58 or 59 is disclosed, wherein the first mounting element is further connected to the side compartment.

In Example 61, the method of straddle-ridden vehicle frame stiffening of any one of Examples 58 to 60 is disclosed, wherein the second mounting element is further connected to the side compartment.

In Example 62, the method of straddle-ridden vehicle frame stiffening of any one of Examples 58 to 61 is disclosed, further including one or more reinforcement fins between the side compartment and at least one of the first mounting element, the second mounting element, the container, or any combination thereof.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A straddle-ridden vehicle comprising:
    a frame, comprising a first frame segment and a second frame segment, wherein the first frame segment is a head pipe or a main pipe, and wherein the second frame segment is a sub-tube holder or a bottom plate;
    a support structure for stiffening the frame, the support structure comprising:
    a first mounting element;
    a second mounting element; and
    a container;
    wherein the first mounting element is mounted to the first frame segment;
    wherein the second mounting element is mounted to the second frame segment; and
    wherein the container is a weight-bearing member between the first frame segment and the second frame segment;
    wherein the support structure further includes a side compartment, attached to a side of the container, and one or more reinforcement fins between the side compartment and at least one of the first mounting element, the second mounting element, or the container.

2. The straddle-ridden vehicle of claim 1, wherein the first frame segment and the second frame segment are arranged with a void between the first frame segment and the second frame segment, and wherein the support structure occupies the void when mounted to the first frame segment and the second frame segment.

3. The straddle-ridden vehicle of claim 1, further comprising at least one dividing element within the container, for dividing the container into a first container portion and a second container portion.

4. The straddle-ridden vehicle of claim 1, wherein the support structure comprises at least one of aluminum, steel, titanium, carbon fiber, or any combination thereof.

5. The straddle-ridden vehicle of claim 1, wherein the support structure is printed in a 3D printing process.

6. The straddle-ridden vehicle of claim 1, wherein the first mounting element includes one or more holes arranged to correspond to one or more mounting regions of the first frame segment; and wherein the second mounting element includes one or more holes arranged to correspond to one or more mounting regions of the second frame segment.

7. A straddle-ridden vehicle frame stiffener comprising:
    a support structure for stiffening a straddle-ridden vehicle frame, the support structure comprising
    a container, defined at least by:

a first side; and a second side, adjacent to the first side;

a first mounting element configured to removeably mount to a first frame segment of the straddle-ridden vehicle frame, the first mounting element being attached to the first side;

two or more second mounting elements configured to removably mount to a second frame segment of the straddle-ridden vehicle frame, the two or more second mounting elements being attached to the second side;

wherein the first side and the second side are rigidly connected to one another; and wherein the support structure further includes a side compartment, attached to a side of the container, and one or more reinforcement fins between the side compartment and at least one of the first mounting element, the second mounting element, or the container.

8. The straddle-ridden vehicle frame stiffener of claim 7, wherein the first side and the second side are connected to one another at approximately 90 degrees.

9. The straddle-ridden vehicle frame stiffener of claim 7, further comprising at least one dividing element within the container, for dividing the container into a first container region and a second container region.

10. The straddle-ridden vehicle frame stiffener of claim 7, wherein the support structure comprises at least one of aluminum, steel, titanium, carbon fiber, or any combination thereof.

11. The straddle-ridden vehicle frame stiffener of claim 7, wherein the support structure is printed in a 3D printing process and/or an additive manufacturing process.

12. The straddle-ridden vehicle frame stiffener of claim 7, wherein the first frame segment comprises at least one of a head pipe segment or a main pipe segment, and wherein the second frame segment comprises at least one of a sub tube holder, a bottom plate, or any combination thereof.

13. A method of straddle-ridden vehicle frame stiffening, comprising:

removing a stressed-member combustion engine from a first frame segment of the straddle-ridden vehicle and a second frame segment of the straddle ridden vehicle;

mounting a frame stiffener to the first frame segment and the second frame segment, the frame stiffener comprising:

a support structure for stiffening the straddle-ridden vehicle frame, the support structure comprising a first side; and a second side, adjacent to the first side;

a first mounting element for removably mounting the support structure to the straddle-ridden vehicle frame, the first mounting element being attached to the first side;

a second mounting element for removably mounting the support structure to the straddle-ridden vehicle frame, the second mounting element being attached to the second side;

wherein the first side and the second side are rigidly connected to one another.

14. The method of straddle-ridden vehicle frame stiffening of claim 13, wherein the first mounting element is configured to removably mount to the first frame segment using one or more mounting bolts, and wherein the second mounting element is configured to removably mount to the second frame segment using one or more mounting bolts.

15. The method of straddle-ridden vehicle frame stiffening of claim 13, wherein the support structure comprises a container, wherein the container has at least one dividing element within the container, for partitioning the container into a first container region and a second container region.

16. The method of straddle-ridden vehicle frame stiffening of claim 13, further comprising mounting the first mounting element to the straddle-ridden vehicle frame via one or more holes arranged to correspond to one or more mounting regions of the first frame segment, and mounting the second mounting element to the straddle-ridden vehicle frame via one or more holes arranged to correspond to one or more mounting regions of the second frame segment.

17. The method of straddle-ridden vehicle frame stiffening of claim 13, wherein the first frame segment comprises at least one of a head pipe segment, a main pipe segment, a front down tube segment, or any combination thereof, and the second frame segment comprises at least one of a sub tube holder, a bottom plate, or any combination thereof.

* * * * *